Nov. 26, 1946.  A. W. PLENSLER  2,411,755
FLUID CLUTCH
Filed March 17, 1945
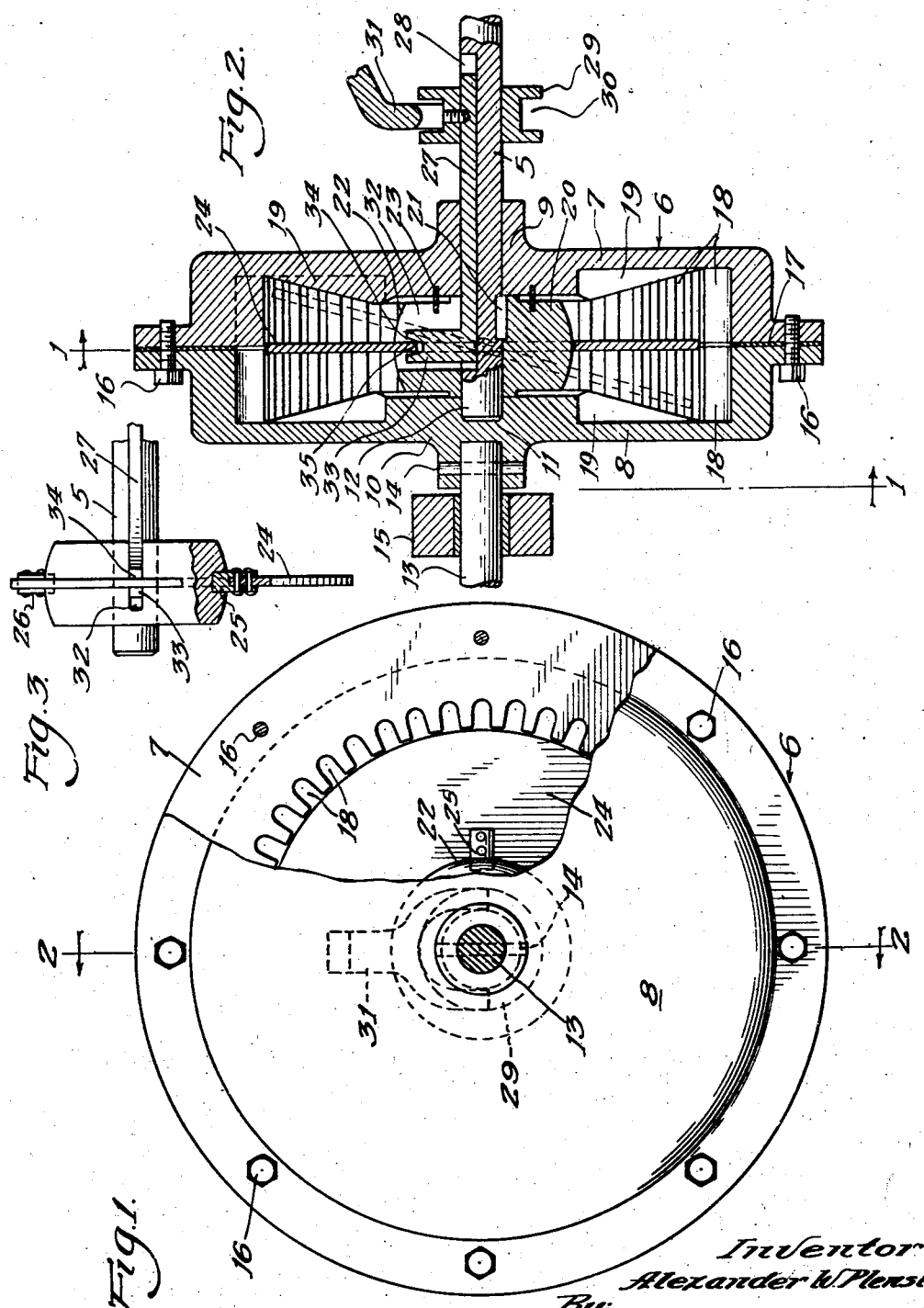
Inventor:
Alexander W. Plensler
By:
Zabel, Carlson, Fitzhugh & Wells
Attorneys Patented Nov. 26, 1946

2,411,755

UNITED STATES PATENT OFFICE 2,411,755

FLUID CLUTCH

Alexander W. Plensler, Chicago, Ill.

Application March 17, 1945, Serial No. 583,358

7 Claims. (Cl. 192—58)

The present invention relates to clutches and is particularly directed to improvements in the type of clutch wherein connection is made from a drive member through a fluid medium to a driven member.

One main purpose of my invention is to provide a clutch of few parts that is simple in construction and free of fast wearing parts.

It is also a purpose of my invention to provide a clutch of the character described that in open position transmits a minimum of energy to the driven member.

The objects and advantages of my invention will appear more fully from the following description and the accompanying drawing wherein a preferred form of the invention is shown. It should be understood however that the drawing and description are illustrative only and are not to be taken as limiting the invention except insofar as it is limited by the claims.

In the drawing:

Figure 1 is a side view, partly in section of the clutch;

Figure 2 is a sectional view on the line 2—2 of Figure 1; and

Figure 3 is a detail view illustrating the pivotal mounting of the disc.

Referring now to the drawing wherein like parts are indicated by like numbers in the several views, a drive shaft 5 is mounted and driven by any suitable power device (not shown). The shaft extends into a shell 6 which is composed of two similar sections 7 and 8. The section 7 has a hub portion 9 which is journalled upon the shaft 5. The section 8 has a hub portion 10 which has a socket 11 rotatably receiving the end 12 of the shaft 5. The hub portion 10 also has a shaft 13 secured therein by a pin 14. The shaft 13 is mounted in a bearing 15. The two shell sections 7 and 8 are flanged at their peripheries and secured together by several screw-bolts 16. A gasket 17 is interposed between the meeting faces of the shell sections.

The interior surfaces of the shell sections are provided with circumferentially spaced channels 18 in the rim portions. Also there are radial ribs 19 on the interior surfaces of the shell sections. The ribs 19 taper outwardly to the rims of the shell sections. The spaces between the ribs 19 align with the channels 18.

The shaft 5 has a hub 20 fixed thereon by some suitable securing means such as a key 21. The hub is provided with a spherical surface 22 and is closely fitted between the hub portions 9 and 10 of the shell. There is a liquid seal ring 23 set into the hub 20 and the hub portion 9 to aid in preventing escape of liquid in the shell along the shaft.

A disc 24 is pivoted on the hub 20 by two pivot pins 25 and 26. These pins may desirably be split to facilitate mounting the disc 24 thereon. The disc 24 has a central aperture of a diameter to closely fit the spherical surface 22 of the hub 20.

In order to turn the disc 24 on the pivot pins 25 and 26, I provide a control means in the form of a bar 27. The bar 27 fits in a groove 28 in the shaft 5. It is fastened to a collar 29 that encircles the shaft. The collar 29 is provided with a groove 30 to receive a yoke 31. The yoke 31 can be shifted lengthwise of the shaft 5 while the shaft is running to adjust the bar 27 lengthwise of the shaft. The bar 27 fits into a slot 32 in the hub 20. It has a radially projecting portion 33 that is provided with a notch 34, the side walls of which taper slightly. The disc 24 has a tongue 35 extending into the slot 32 and into the notch 34. By moving the yoke 31 the bar 27 can be shifted lengthwise of the shaft and this in turn causes the disc to turn about its pivot pins 25 and 26. The portion 33 of the bar 27 extends outward halfway between the two pivot pins. The notch 34 is deep enough to prevent binding of the tongue 35 therein when the disc is turned into engagement with the ribs 19.

The theory of operation of the device is quite simple. The disc 24 in its rotation will cause substantially no torque tending to rotate the shell 6 so long as the disc is perpendicular to the shell axis because there is no transmission of liquid. The only energy transmitted is that due to friction of the liquid on the surface of the disc 24 and the hub 20. However, if the disc is tilted slightly from its inoperative position, the rotation of the disc in the shell will displace the liquid in the shell and this displacement is in a direction to cause a rotating movement of the shell itself. The direction of the force tending to rotate the shell is the same for both halves of the shell and the greater the displacement of the disc with respect to the perpendicular of the drive shaft 5, the greater will be its tendency to force the shell to turn with it. The theoretical maximum is when the disc lies in such position as to seal the interior of the shell into two separate chambers so that rotation of the disc would require rotation of the shell too. This condition is approached closely enough for all practical purposes when the disc 24 is against the ribs 19. There is slip, of course, but it is desirable for many purposes. The interior surfaces of the shell portions between the channels 18 may be shaped to follow more or less closely to the path of the periphery of the disc as desired within the scope of this invention.

The rotation of the disc plus the rotation of the shell sets up a centrifugal force which tends to keep the maximum liquid at the periphery of the disc and also keeps away the liquid leakage where the drive shaft enters the shell. That is the only place where any leakage problem exists. The disc when it is tilted and under load tends to move to the maximum tilt because of pressure of liquid against it. Under no load condition and high speed the centrifugal force tends to return the disc to neutral position where it lies in a plane perpendicular to the shaft. When the disc is shifted out of the perpendicular plane, one half of the disc is sweeping liquid before it and forcing the liquid outwardly against the face of the left hand shell half. At the same time however, the other half of the disc is moving in the same direction, but is tending to force the liquid on its side outwardly against the shell on the right hand side. The forces set up by this action are borne primarily by the pins 25 and 26 and do not have any very strong tendency to turn the disc about the pins as an axis.

From the foregoing description it is believed that the nature and advantages of my invention will be readily apparent to those skilled in the art to which it pertains.

Having thus described my invention, I claim:

1. A device of the character described comprising a drive shaft, a disc encircling said shaft and secured to the shaft to rotate therewith and pivoted to said shaft on an axis at substantially right angles to the shaft, a driven member including a shell enclosing said disc and rotatable on the shaft, the interior diameter of said shell in a plane perpendicular to the shaft through the pivots of the disc being slightly greater than that of the disc wherein the disc may rotate within the shell, and means to shift said disc about its pivot.

2. A device of the character described comprising a drive shaft, a disc encircling said shaft and secured to the shaft to rotate therewith and pivoted to said shaft on an axis at substantially right angles to the shaft, a driven member including a shell enclosing said disc and rotatable on the shaft, the interior diameter of said shell in a plane perpendicular to the shaft through the pivots of the disc being slightly greater than that of the disc wherein the disc may rotate within the shell, the shell being provided with internal channels running transversely to the disc, and means to shift said disc about its pivot.

3. A device of the character described comprising a drive member including a hub having its outer surface formed in the shape of a segment of a sphere, a disc rotatable with the hub and pivotally mounted on said hub and having its axis passing through the center of said spherical surface, means movable with respect to said hub for adjusting the disc about its pivot, and a shell enclosing said disc and providing a liquid tight chamber about said disc, the interior surface of the shell being substantially symmetrical about a plane perpendicular to the axis of rotation of said hub through the pivots of said disc.

4. A fluid clutch device comprising a drive shaft, a hub portion thereon, a disc encircling said shaft and secured to the shaft to rotate therewith and pivoted on the hub portion for rotation about an axis at substantially right angles to the axis of the shaft, a driven member comprising a shell forming a substantial liquid tight chamber about the disc, and means to adjust the disc about its pivot.

5. A fluid clutch device comprising a drive shaft, a hub portion thereon, a disc encircling said shaft and secured to the shaft to rotate therewith and pivoted on the hub portion for rotation about an axis at substantially right angles to the axis of the shaft, a driven member comprising a shell forming a substantial liquid tight chamber about the disc, and means to adjust the disc about its pivot, said shell having projections on the interior surface thereof positioned to oppose travel of fluid along its surface in the direction of rotation of the disc.

6. A fluid clutch device comprising a drive shaft, a hub portion thereon, a disc encircling said shaft and secured to the shaft to rotate therewith and pivoted on the hub portion for rotation about an axis at substantially right angles to the axis of the shaft, a driven member comprising a shell forming a substantial liquid tight chamber about the disc, and means to adjust the disc about its pivot, said shell having fluid channels in its interior side walls.

7. A fluid clutch device comprising a drive shaft, a hub portion thereon, a disc encircling said shaft and secured to the shaft to rotate therewith and pivoted on the hub portion for rotation about an axis at substantially right angles to the axis of the shaft, a driven member comprising a shell forming a substantial liquid tight chamber about the disc, and means to adjust the disc about its pivot, said shell having fluid channels at its interior peripheral surface running transversely of the path of rotation of the disc.

ALEXANDER W. PLENSLER.